United States Patent [19]

Beatty

[11] 4,010,287

[45] Mar. 1, 1977

[54] PROCESS FOR PREPARING METAL-CARBIDE-CONTAINING MICROSPHERES FROM METAL-LOADED RESIN BEADS

[75] Inventor: Ronald L. Beatty, Oak Ridge, Tenn.

[73] Assignee: The United States of America as represented by the United States Energy Research and Development Administration, Washington, D.C.

[22] Filed: June 18, 1974

[21] Appl. No.: 480,324

[52] U.S. Cl. .................................. 427/6; 427/213; 427/214; 427/215; 427/216; 427/249; 427/372 R; 427/402
[51] Int. Cl.² .................................. G21C 3/06
[58] Field of Search .......... 117/46 CG, 106, 169 R, 117/DIG. 6, 46 CC; 264/.5; 427/6, 249, 372, 402, 213, 214, 216, 215

[56] References Cited

UNITED STATES PATENTS

| | | | |
|---|---|---|---|
| 3,438,749 | 4/1969 | Lonadier et al. | 264/.5 |
| 3,617,342 | 11/1971 | Preston et al. | 264/.5 |
| 3,619,241 | 11/1971 | Goedell et al. | 117/46 CG |
| 3,833,470 | 9/1974 | Gyarmati et al. | 264/.5 |

*Primary Examiner*—Ronald H. Smith
*Assistant Examiner*—Janyce A. Bell
*Attorney, Agent, or Firm*—Dean E. Carlson; David S. Zachry; Irving Barrack

[57] ABSTRACT

An improved process for producing porous spheroidal particles consisting of a metal carbide phase dispersed within a carbon matrix is described. According to the invention metal-loaded ion-exchange resin microspheres which have been carbonized are coated with a buffer carbon layer prior to conversion of the oxide to carbide in order to maintain porosity and avoid other adverse sintering effects.

4 Claims, No Drawings

PROCESS FOR PREPARING METAL-CARBIDE-CONTAINING MICROSPHERES FROM METAL-LOADED RESIN BEADS

BACKGROUND OF THE INVENTION

The invention described herein was made in the course of, or under, a contract with the United States Atomic Energy Commission.

The present invention relates to an improved process for treating or converting certain metal-loaded ion-exchange resin microspheres into microspheres consisting of a porous carbon or graphite matrix containing a dispersed metal carbide or metal oxide-carbide phase. In the context of this invention a microsphere refers to a spheroidal particle ranging from 5 to 2000 microns in diameter; ion-exchange resin refers to spheroidal-shaped resins, which may consist in one case of porous cation-exchange resins having exchange sites, said resins consisting of copolymers of acrylic or methacrylic acid and divinylbenzene. Such resins are available commercially as represented by Amberlite IRC-72, available from Rohm & Haas Company, Philadelphia, Pa.

It has previously been proposed to utilize carbonized or graphitized fissile and/or fertile metal-loaded ion-exchange resin microspheres as nuclear fuel where the metal is selected from uranium, thorium, or plutonium, or mixtures thereof and where the metal exists as an oxide, carbide, or oxide-carbide mixture dispersed within a carbon or graphite matrix. A process for the formation of microspheroidal nuclear fuels derived from spheroidal ion-exchange resin beads or microspheres is described in U.S. Pat. 3,880,769 of common assignee. Resin-derived fuels have the potential merit of being fairly cheap to produce, of resulting in a porous spheroidal product, and of being amenable for deposition of pyrolytic carbon coatings to retain fission products. The coated particles are amenable for reprocessing for recovery of unburnt fuel and separation from fission products. There are, however, operational difficulties in forming carbide fuels derived from ion-exchange resins which must be overcome in order to realize the full potential of such fuels.

In order to make a carbide fuel from a metal-loaded resin it must be heated (i.e., converted) at a temperature in the range 1200°–2000° C. in an inert atmosphere such as argon or helium. Carbonization up to 1200° C produces a metal oxide dispersion in a carbon matrix; further heat treatment up to 2000° C. converts the oxide to carbide where the rate of conversion in a fluidized bed depends on such factors as temperature, which determines the partial pressure of CO, and specific sweep rate or gas flow rate relative to batch size. Experience has shown that conversion of the metal-loaded resin at carbide-forming temperatures can result in extensive particle agglomeration accompanied by loss of sphericity and porosity. These effects are attributable to sintering of the oxide or carbide components of the carbonized resin. Moreover, since different increments of a given charge of imperfectly fluidized resin particles are subject to slightly varying degrees of sintering, the resulting particles can be non-uniform in size, shape, porosity, and composition. It is important in this technology that a given charge of product microspheres be as uniform as possible in these respects.

It is accordingly a general object of this invention to provide a process by which the aforementioned adverse sintering effects are avoided.

A principal object of this invention is to provide a process for converting spheroidal or spherical metal-loaded resin microspheres to spheroidal or spherical particles consisting of a porous carbon or graphite matrix containing a dispersed phase of a metal carbide $MC_x$, where x is a number ranging from 1 to 2, or a mixture of $MC_x$ with $MO_2$, where M may be any metal selected from the group having an automatic number in the range 58–71, 90–105, boron, cadmium, or any heavy metal carbide which may be usefully incorporated within a porous carbon matrix as a dispersed phase.

Another object is to provide uniform particles of the character described.

Nuclear fuel particles designed for use in high-temperature gas-cooled reactors (HTGR) may consist of kernels of a fissile material, uranium, or a fertile material, thorium, existing as an oxide or carbide or a mixture of oxide and carbide where the kernel is first coated with low-density so-called buffer carbon layer deposited from a decomposed hydrocarbon gas such as acetylene diluted with an inert gas such as argon or helium in a fluidized bed coater. By changing the coating conditions, a second high-density isotropic carbon coating can be deposited to form a product BISO-coated particle. If a TRISO-coated particle is desired, the additional SiC and carbon layers can be deposited in the same or separte operations. In one form of coated particle, a dense $UO_{22}$ kernel or microsphere is used which is formed by known sol-gel processes. The sol-gel process involves a series of complex fabrication sequences which require close control of process parameters and involves fairly high fabrication costs. On the other hand, fissile or fertile microspheres made from spheroidal ion-exchange microspheres offer the promise of low fabrication cost since the original ion-exchange miscrosphere is preformed and available commercially as a low-cost off-the-shelf product. Because the metal-loaded microspheres are porous, they can provide an internal volume to accommodate fuel swelling and fission product gas which develops during reactor operation. It is therefore an additional object of the present invention to provide an improved fissile or fertile coated particle having a porous fissile or fertile carbide-containing kernel and to provide a method for obtaining the same. A further object is to teach a process for converting a metal-oxide-loaded porous resin microsphere to a carbide-loaded microsphere in which a substantial percentage of the porosity and sphericity of the resin microsphere is maintained during the conversion.

SUMMARY OF THE INVENTION

The present invention is predicated on the discovery that the aforementioned adverse sintering effects observed during conversion of the oxide-loaded resin to a metal carbide dispersion in a carbon or graphite matrix can be averted by applying a buffer carbon layer at pre-carbide-forming temperatures. The term "buffer carbon" refers to a low-density (less than 1.3 g/cc), highly porous carbon deposited by thermal decomposition of acetylene as disclosed, for example, U.S. Pat. No. 3,472,677. Specifically, the buffer carbon layer is deposited on a metal-oxide-loaded resin which has been carbonized up to a temperature of about 1200° C. in a fluidized bed. Carbonization of the metal-loaded weak-acid resin to an oxide dispersion within a carbon matrix may be effected by heating at a high rate from 50° to 300° C. per minute up to a temperature of about 1200° C. using an inert gas such as argon for fluidization. At this point, according to the invention, the fluidizing gas is changed to a mixture of acetylene and a minor amount of argon to form a buffer coating on the particles. Fluidization is then continued with argon and the temperature is raised to a temperature in the range 1500°–2000° C. to produce carbide. In cases where an oxide-carbide mixture is desired, reaction should be carried out at an intermediate temperature in the range 1400°–1700° C. To add a dense carbon coating, the temperature in the fluidized bed is lowered to a temperature in the range 1200°–1500° C. Propylene is then substituted for the argon fluidizing gas for a short period, 5–15 minutes, until an isotropic carbon coating deposits over the buffer coat. If a TRISO coating is desired, the additional SiC and carbon layer may then be deposited in this or separate operations.

Particles produced by the method of the present invention maintain sphericity and a substantial portion of their original porosity during the entire course of carbide formation and do not agglomerate. Because the particles do not agglomerate, close control can be maintained over the degree of reduction of the metal oxide. In a process characterized by particle agglomeration, i.e., adverse sintering, the carbide conversion is essentially of solid-state-diffusion-controlled process, and the rate of carbide conversion slows in an uncontrolled manner when agglomeration has occured. On the other hand, when the fluidized particles do not agglomerate, carbide conversion can be discretely controlled to a desired degree by time, specific gas flow rate, and the partial pressure of CO at a given temperature. Thus, size, shape, and composition uniformity of a given metal-loaded resin microsphere charge can be controlled within close specification tolerances.

The improved process is illustrated in the following representative example to form $UC_2$ microspheres.

EXAMPLE

A 70-g batch of dried weak-acid resin (Rohm & Haas IRC-72) containing about 34 g uranium was loaded into a 1⅜-in. fluidized-bed coater furnace. Using argon for fluidization, the furnace was heated at about 100° C./min. up to about 600° C. and thereafter the heating rate was increased until a temperature of 1125° C. was attained. This carbonized the resin constituents without any structural damage to the particle while retaining the uranium as $UO_2$. The temperature was maintained at 1125° C. and the gas was changed to acetylene ($C_2H_2$), with a minor argon dilution. Under these conditions a carbon buffer coating of about 20 microns was applied in 3 minutes.

Since the final desired product was a $UC_2$ dispersion in a porous carbon matrix, the flow of acetylene was stopped and fluidization was continued solely with argon as the particles were heated to 1800° C. and held at the temperature for 10 minutes. This had previously been shown to be sufficient time-temperature condition for complete conversion of $UO_2$ to $UC_2$. The temperature was thereafter reduced to 1275° C. and a low-temperature isotropic coating of 40 microns applied in 5 minutes using undiluted propylene.

Particles coated as described above were examined by radiography and metallography and appeared to have satisfactory geometry and physical properties for HTGR fuel. Although not considered to be detrimental, some particles exhibited a void region between the kernel and the inner surface of the buffer coat. This resulted from some kernel densification (shrinkage) during the conversion from oxide to carbon. The total void volume within the coatings is, however, determined by the kernel pore volume prior to coating and thus no special adjustment of void volume by buffer coating thickness is required. If the void region is considered detrimental, less densification during conversion can be effected if the initial portion of the carbonization (up to 600° C.) is carried out at a heating rate of 50°–75°0 C./min. in contrast to the $\geq$ 100° C./min.

While the invention has been described and exemplified in terms of uranium-loaded microspheres, it should be understood that other metals such as boron; cadium; rare earth metals such as yttrium, and those having an atomic number in the range 58–71; actinide earth metals having an atomic number in the range 90–105, particularly thorium and plutonium, as well as other heavy metals may be usefully incorporated in spherules of the kind described as a carbide or oxide-carbide phase dispersed within a carbon matrix.

What is claimed is:

1. In a process for producing discrete porous spheroidal particles consisting of a dispersion of a metal carbide or oxide-carbide mixture within a carbon matrix, the improvement which comprises carbonizing a metal-loaded ion-exchange resin microsphere within a fluidized bed to create a carbonized microphere consisting essentially of a dispersion of metal oxide within a carbon matrix, coating the carbonized microsphere with a buffer carbon layer resulting from the thermal decomposition of acetylene, and then heating the coated oxide-containing microsphere at a temperature for a time sufficient to convert at least a portion of the oxide to carbide.

2. In a process for producing discrete porous spheroidal particles consisting of a dispersion of a uranium carbide or $UC_2$—$UO_2$ mixture within a carbon matrix, the improvement which comprises carbonizing a uranium-loaded ion-exchange resin microsphere within a fluidized bed to a temperature which produces a microsphere consisting of a dispersion of $UO_2$ within a porous carbon matrix, coating said composition with a buffer carbon layer, and then heating the buffer-carbon-coated microsphere at a temperature in the range 1500°–2000° C. and for a time sufficient to convert at least a portion of the $UO_2$ to $UC_2$.

3. The process according to claim 1 in which the resin microspheres are derived from copolymers of acrylic acid or methacrylic acid with divinylbenzene.

4. The method according to claim 2 in which an isotropic carbon layer is applied on the buffer coating.

* * * * *